United States Patent
Oehring et al.

(10) Patent No.: US 9,745,840 B2
(45) Date of Patent: Aug. 29, 2017

(54) ELECTRIC POWERED PUMP DOWN

(71) Applicant: US WELL SERVICES LLC, Houston, TX (US)

(72) Inventors: Jared Oehring, Houston, TX (US); Brandon N. Hinderliter, Houston, TX (US)

(73) Assignee: US WELL SERVICES LLC, Houston, TX (US)

( * ) Notice: Subject to any disclaimer, the term of this patent is extended or adjusted under 35 U.S.C. 154(b) by 0 days.

(21) Appl. No.: 15/291,842

(22) Filed: Oct. 12, 2016

(65) Prior Publication Data

US 2017/0030178 A1    Feb. 2, 2017

Related U.S. Application Data

(63) Continuation-in-part of application No. 15/202,085, filed on Jul. 5, 2016, which is a continuation of
(Continued)

(51) Int. Cl.
| | | |
|---|---|---|
| E21B 43/26 | (2006.01) |
| F01D 15/10 | (2006.01) |
| H02P 23/00 | (2016.01) |
| E21B 43/267 | (2006.01) |
| F01D 15/08 | (2006.01) |
| F04B 17/03 | (2006.01) |
| F04B 19/22 | (2006.01) |
| F04B 49/20 | (2006.01) |
| F02C 3/22 | (2006.01) |
| F04B 47/02 | (2006.01) |

(Continued)

(52) U.S. Cl.
CPC ............ *E21B 43/26* (2013.01); *E21B 23/08* (2013.01); *E21B 43/267* (2013.01); *F01D 15/08* (2013.01); *F01D 15/10* (2013.01); *F02C 3/22* (2013.01); *F04B 17/03* (2013.01); *F04B 19/22* (2013.01); *F04B 23/04* (2013.01); *F04B 47/02* (2013.01); *F04B 49/065* (2013.01); *F04B 49/20* (2013.01); *H02P 23/00* (2013.01); *F05D 2220/32* (2013.01)

(58) Field of Classification Search
CPC ......... E21B 29/02; E21B 43/162; E21B 43/26
USPC .......... 166/52, 50, 245, 297, 299, 63, 308.1, 166/177.2, 177.5
See application file for complete search history.

(56) References Cited

U.S. PATENT DOCUMENTS

| | | | |
|---|---|---|---|
| 1,671,436 A | 5/1928 | Melott |
| 2,004,077 A | 6/1935 | McCartney |

(Continued)

FOREIGN PATENT DOCUMENTS

JP    2004264589    9/2004

OTHER PUBLICATIONS

Non-Final Office Action issued in corresponding U.S. Appl. No. 15/293,681 dated Feb. 16, 2017.
(Continued)

*Primary Examiner* — Kenneth L Thompson
(74) *Attorney, Agent, or Firm* — Hogan Lovells US LLP

(57) ABSTRACT

A method of operations in a subterranean formation, including driving a pump with an electrically powered motor to pressurize fluid, inserting a tool into a wellbore that intersects the formation, and directing the pressurized fluid into the wellbore above the tool to push the tool into the wellbore.

20 Claims, 8 Drawing Sheets

Related U.S. Application Data application No. 13/679,689, filed on Nov. 16, 2012, now Pat. No. 9,410,410.

(60) Provisional application No. 62/242,173, filed on Oct. 15, 2015.

(51) Int. Cl.
  *F04B 23/04* (2006.01)
  *F04B 49/06* (2006.01)
  *E21B 23/08* (2006.01)

(56) References Cited

U.S. PATENT DOCUMENTS

| | | | |
|---|---|---|---|
| 2,220,622 A | 11/1940 | Aitken | |
| 2,248,051 A | 7/1941 | Armstrong | |
| 3,061,039 A | 10/1962 | Peters | |
| 3,066,503 A | 12/1962 | Fleming | |
| 3,334,495 A | 8/1967 | Jensen | |
| 3,722,595 A | 3/1973 | Kiel | |
| 3,764,233 A | 10/1973 | Strickland | |
| 3,773,140 A | 11/1973 | Mahajan | |
| 3,837,179 A | 9/1974 | Barth | |
| 3,849,662 A | 11/1974 | Blaskowski | |
| 3,881,551 A | 5/1975 | Terry | |
| 4,037,431 A | 7/1977 | Sugimoto | |
| 4,151,575 A | 4/1979 | Hogue | |
| 4,226,299 A | 10/1980 | Hansen | |
| 4,442,665 A | 4/1984 | Fick et al. | |
| 4,456,092 A | 6/1984 | Kubozuka | |
| 4,506,982 A | 3/1985 | Smithers et al. | |
| 4,512,387 A | 4/1985 | Rodriguez | |
| 4,538,916 A | 9/1985 | Zimmerman | |
| 4,676,063 A | 6/1987 | Goebel et al. | |
| 4,793,386 A | 12/1988 | Sloan | |
| 4,845,981 A | 7/1989 | Pearson | |
| 4,922,463 A | 5/1990 | Del Zotto et al. | |
| 5,025,861 A | 6/1991 | Huber et al. | |
| 5,130,628 A | 7/1992 | Owen | |
| 5,131,472 A * | 7/1992 | Dees | E21B 43/116 166/284 |
| 5,422,550 A | 6/1995 | McClanahan | |
| 5,548,093 A | 8/1996 | Sato | |
| 5,590,976 A | 1/1997 | Kilheffer et al. | |
| 5,655,361 A | 8/1997 | Kishi | |
| 5,736,838 A | 4/1998 | Dove et al. | |
| 5,790,972 A | 8/1998 | Kohlenberger | |
| 5,865,247 A | 2/1999 | Paterson | |
| 5,879,137 A | 3/1999 | Yie | |
| 5,894,888 A * | 4/1999 | Wiemers | C09K 8/72 166/250.1 |
| 5,907,970 A | 6/1999 | Havlovick et al. | |
| 6,142,878 A | 11/2000 | Barin | |
| 6,164,910 A | 12/2000 | Mayleben | |
| 6,202,702 B1 | 3/2001 | Ohira | |
| 6,254,462 B1 | 7/2001 | Kelton | |
| 6,271,637 B1 | 8/2001 | Kushion | |
| 6,315,523 B1 | 11/2001 | Mills | |
| 6,477,852 B2 | 11/2002 | Dodo | |
| 6,491,098 B1 * | 12/2002 | Dallas | E21B 43/116 166/297 |
| 6,529,135 B1 | 3/2003 | Bowers et al. | |
| 6,776,227 B2 | 8/2004 | Beida | |
| 6,802,690 B2 | 10/2004 | Han | |
| 6,808,303 B2 | 10/2004 | Fisher | |
| 6,931,310 B2 | 8/2005 | Shimizu et al. | |
| 7,170,262 B2 | 1/2007 | Pettigrew | |
| 7,173,399 B2 * | 2/2007 | Sihler | B60L 11/123 318/434 |
| 7,312,593 B1 | 12/2007 | Streicher et al. | |
| 7,336,514 B2 | 2/2008 | Amarillas | |
| 7,445,041 B2 * | 11/2008 | O'Brien | E21B 43/2635 166/247 |
| 7,500,642 B2 | 3/2009 | Cunningham | |
| 7,525,264 B2 | 4/2009 | Dodge | |
| 7,563,076 B2 | 7/2009 | Brunet | |
| 7,683,499 B2 | 3/2010 | Saucier | |
| 7,755,310 B2 | 7/2010 | West et al. | |
| 7,807,048 B2 * | 10/2010 | Collette | C10B 47/44 198/657 |
| 7,845,413 B2 | 12/2010 | Shampine | |
| 7,977,824 B2 | 7/2011 | Halen et al. | |
| 8,037,936 B2 | 10/2011 | Neuroth | |
| 8,054,084 B2 | 11/2011 | Schulz et al. | |
| 8,083,504 B2 | 12/2011 | Williams | |
| 8,096,891 B2 | 1/2012 | Lochtefeld | |
| 8,146,665 B2 | 4/2012 | Neal | |
| 8,261,528 B2 | 9/2012 | Chillar | |
| 8,272,439 B2 * | 9/2012 | Strickland | E21B 33/12 166/255.2 |
| 8,310,272 B2 | 11/2012 | Quarto | |
| 8,354,817 B2 | 1/2013 | Yeh et al. | |
| 8,474,521 B2 | 7/2013 | Kajaria | |
| 8,534,235 B2 | 9/2013 | Chandler | |
| 8,573,303 B2 * | 11/2013 | Kerfoot | C02F 9/00 166/267 |
| 8,596,056 B2 | 12/2013 | Woodmansee | |
| 8,692,408 B2 | 4/2014 | Zhang et al. | |
| 8,727,068 B2 | 5/2014 | Bruin | |
| 8,760,657 B2 | 6/2014 | Pope | |
| 8,774,972 B2 | 7/2014 | Rusnak et al. | |
| 8,789,601 B2 | 7/2014 | Broussard | |
| 8,807,960 B2 | 8/2014 | Stephenson | |
| 8,838,341 B2 | 9/2014 | Kumano | |
| 8,857,506 B2 | 10/2014 | Stone, Jr. | |
| 8,899,940 B2 | 12/2014 | Leugemors | |
| 8,905,056 B2 | 12/2014 | Kendrick | |
| 8,905,138 B2 | 12/2014 | Lundstedt et al. | |
| 8,997,904 B2 | 4/2015 | Cryer | |
| 9,018,881 B2 | 4/2015 | Mao et al. | |
| 9,051,822 B2 | 6/2015 | Ayan | |
| 9,067,182 B2 | 6/2015 | Nichols | |
| 9,103,193 B2 | 8/2015 | Coli | |
| 9,140,110 B2 | 9/2015 | Coli et al. | |
| 9,160,168 B2 | 10/2015 | Chapel | |
| 9,322,239 B2 * | 4/2016 | Angeles Boza | E21B 23/10 |
| 9,366,114 B2 | 6/2016 | Coli et al. | |
| 9,410,410 B2 | 8/2016 | Broussard et al. | |
| 9,450,385 B2 | 9/2016 | Kristensen | |
| 9,587,649 B2 | 3/2017 | Oehring | |
| 2003/0138327 A1 | 7/2003 | Jones et al. | |
| 2005/0116541 A1 | 6/2005 | Seiver | |
| 2007/0187163 A1 | 8/2007 | Cone | |
| 2007/0201305 A1 | 8/2007 | Heilman et al. | |
| 2007/0226089 A1 | 9/2007 | DeGaray et al. | |
| 2007/0278140 A1 | 12/2007 | Mallett et al. | |
| 2008/0112802 A1 | 5/2008 | Orlando | |
| 2008/0137266 A1 | 6/2008 | Jensen | |
| 2008/0217024 A1 * | 9/2008 | Moore | E21B 4/18 166/382 |
| 2008/0264649 A1 | 10/2008 | Crawford | |
| 2009/0065299 A1 | 3/2009 | Vito | |
| 2009/0153354 A1 | 6/2009 | Daussin et al. | |
| 2009/0188181 A1 | 7/2009 | Forbis | |
| 2009/0200035 A1 | 8/2009 | Bjerkreim et al. | |
| 2009/0260826 A1 | 10/2009 | Sherwood | |
| 2009/0308602 A1 | 12/2009 | Bruins et al. | |
| 2010/0000508 A1 | 1/2010 | Chandler | |
| 2010/0132949 A1 | 6/2010 | DeFosse et al. | |
| 2010/0146981 A1 | 6/2010 | Motakef | |
| 2010/0250139 A1 | 9/2010 | Hobbs et al. | |
| 2010/0293973 A1 | 11/2010 | Erickson | |
| 2010/0303655 A1 | 12/2010 | Scekic | |
| 2010/0322802 A1 | 12/2010 | Kugelev | |
| 2011/0005757 A1 | 1/2011 | Hebert | |
| 2011/0017468 A1 * | 1/2011 | Birch | E21B 17/026 166/369 |
| 2011/0085924 A1 | 4/2011 | Shampine | |
| 2011/0272158 A1 | 11/2011 | Neal | |
| 2012/0018016 A1 | 1/2012 | Gibson | |
| 2012/0085541 A1 | 4/2012 | Love et al. | |
| 2012/0127635 A1 | 5/2012 | Grindeland | |
| 2012/0205301 A1 | 8/2012 | McGuire et al. | |

(56) References Cited

U.S. PATENT DOCUMENTS

| | | |
|---|---|---|
| 2012/0205400 A1 | 8/2012 | DeGaray et al. |
| 2012/0255734 A1 | 10/2012 | Coli et al. |
| 2013/0025706 A1 | 1/2013 | DeGaray et al. |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1* | 12/2013 | Roberts ............... E21B 43/263 166/308.1 |
| 2014/0000899 A1 | 1/2014 | Nevison |
| 2014/0010671 A1 | 1/2014 | Cryer et al. |
| 2014/0096974 A1 | 4/2014 | Coli |
| 2014/0124162 A1 | 5/2014 | Leavitt |
| 2014/0251623 A1 | 9/2014 | Lestz et al. |
| 2015/0083426 A1 | 3/2015 | Lesko |
| 2015/0114652 A1 | 4/2015 | Lestz |
| 2015/0159911 A1 | 6/2015 | Holt |
| 2015/0175013 A1 | 6/2015 | Cryer |
| 2015/0176386 A1* | 6/2015 | Castillo ................ E21B 43/26 166/250.1 |
| 2015/0211524 A1 | 7/2015 | Broussard |
| 2015/0225113 A1 | 8/2015 | Lungu |
| 2015/0252661 A1 | 9/2015 | Glass |
| 2016/0032703 A1 | 2/2016 | Broussard et al. |
| 2016/0105022 A1 | 4/2016 | Oehring |
| 2016/0177678 A1 | 6/2016 | Morris |
| 2016/0208592 A1 | 7/2016 | Oehring |
| 2016/0221220 A1 | 8/2016 | Paige |
| 2016/0258267 A1 | 9/2016 | Payne et al. |
| 2016/0273328 A1 | 9/2016 | Oehring |
| 2016/0290114 A1 | 10/2016 | Oehring |
| 2016/0319650 A1 | 11/2016 | Oehring |
| 2016/0326854 A1 | 11/2016 | Broussard |
| 2016/0348479 A1 | 12/2016 | Oehring |
| 2016/0349728 A1 | 12/2016 | Oehring |
| 2017/0022788 A1 | 1/2017 | Oehring et al. |
| 2017/0028368 A1 | 2/2017 | Oehring et al. |
| 2017/0030177 A1 | 2/2017 | Oehring et al. |

OTHER PUBLICATIONS

Non-Final Office Action issued in corresponding U.S. Appl. No. 15/294,349 dated Mar. 14, 2017.

Final Office Action issued in corresponding U.S. Appl. No. 15/145,491 dated Jan. 20, 2017.

Non-Final Office Action issued in corresponding U.S. Appl. No. 15/145,443 dated Feb. 7, 2017.

Notice of Allowance issued in corresponding U.S. Appl. No. 15/217,040 dated Mar. 28, 2017.

Notice of Allowance issued in corresponding U.S. Appl. No. 14/622,532 dated Mar. 27, 2017.

UK Power Networks—Transformers to Supply Heat to Tate Modern—from Press Releases May 16, 2013. .

Non-Final Office Action issued in Corresponding U.S. Appl. No. 15/145,491 dated May 15, 2017.

Non-Final Office Action issued in corresponding U.S. Appl. No. 15/486,970 dated Jun. 22, 2017.

Non-Final Office Action issued in corresponding U.S. Appl.No. 15/487,656 dated Jun. 23, 2017.

Non-Final Office Action issued in corresponding U.S. Appl. No. 15/487,694 dated Jun. 26, 2017.

Final Office Action issued in corresponding U.S. Appl. No. 15/294,349 dated Jul. 6, 2017.

\* cited by examiner

ELECTRIC POWERED PUMP DOWN

CROSS REFERENCE TO RELATED APPLICATIONS

This application claims priority to and the benefit of, U.S. Provisional Application Ser. No. 62/242,173, filed Oct. 15, 2015 and is a continuation-in-part of, and claims priority to and the benefit of co-pending U.S. patent application Ser. No. 15/202,085, filed Jul. 5, 2016, and which claims priority to and the benefit of Ser. No. 13/679,689, filed Nov. 16, 2012, which issued as U.S. Pat. No. 9,410,410 on Aug. 9, 2016; the full disclosures of which are hereby incorporated by reference herein for all purposes.

BACKGROUND OF THE INVENTION

1. Field of Invention

The present disclosure relates to operations in a subterranean formations. In particular, the present disclosure relates to a system that uses fluid pressurized by electrically powered pumps for fracturing and for pump down operations.

2. Description of Prior Art

Hydraulic fracturing is a technique used to stimulate production from some hydrocarbon producing wells. The technique usually involves injecting fluid into a wellbore at a pressure sufficient to generate fissures in the formation surrounding the wellbore. Typically the pressurized fluid is injected into a portion of the wellbore that is pressure isolated from the remaining length of the wellbore so that fracturing is limited to a designated portion of the formation. The fracturing fluid slurry, whose primary component is usually water, includes proppant (such as sand or ceramic) that migrate into the fractures with the fracturing fluid slurry and remain to prop open the fractures after pressure is no longer applied to the wellbore. A primary fluid for the slurry other than water, such as nitrogen, carbon dioxide, foam (nitrogen and water), diesel, or other fluids is sometimes used as the primary component instead of water. Typically hydraulic fracturing fleets include a data van unit, blender unit, hydration unit, chemical additive unit, hydraulic fracturing pump unit, sand equipment, and other equipment.

Traditionally, the fracturing fluid slurry has been pressurized on surface by high pressure pumps powered by diesel engines. To produce the pressures required for hydraulic fracturing, the pumps and associated engines have substantial volume and mass. Heavy duty trailers, skids, or trucks are required for transporting the large and heavy pumps and engines to sites where wellbores are being fractured. Each hydraulic fracturing pump is usually composed of a power end and a fluid end. The hydraulic fracturing pump also generally contains seats, valves, a spring, and keepers internally. These parts allow the hydraulic fracturing pump to draw in low pressure fluid slurry (approximately 100 psi) and discharge the same fluid slurry at high pressures (over 10,000 psi). Recently electrical motors controlled by variable frequency drives have been introduced to replace the diesel engines and transmission, which greatly reduces the noise, emissions, and vibrations generated by the equipment during operation, as well as its size footprint.

On each separate unit, a closed circuit hydraulic fluid system is often used for operating auxiliary portions of each type of equipment. These auxiliary components may include dry or liquid chemical pumps, augers, cooling fans, fluid pumps, valves, actuators, greasers, mechanical lubrication, mechanical cooling, mixing paddles, landing gear, and other needed or desired components. This hydraulic fluid system is typically separate and independent of the main hydraulic fracturing fluid slurry that is being pumped into the wellbore.

SUMMARY OF THE INVENTION

Certain embodiments of the present technology provide a method of operations in a subterranean formation. The method includes driving a pump with an electrically powered motor to pressurize fluid, inserting a tool into a wellbore that intersects the formation, and directing the pressurized fluid into the wellbore above the tool to push the tool into the wellbore. In some embodiments, the method can further include urging the tool into the wellbore with the pressurized fluid until the tool reaches a predetermined location in the formation. In addition, the tool can be a perforating gun.

According to some embodiments, the wellbore can include a first wellbore, wherein the pressurized fluid is simultaneously directed to a second wellbore that also intersects the subterranean formation. Hydraulic fracturing can be performed in the second wellbore. Furthermore, the pump can include a first pump and a second pump, wherein fluid pressurized by the first pump is directed into the first wellbore to push the tool into the first wellbore, and fluid pressurized by the second pump is directed into the second wellbore to use in hydraulic fracturing.

Additional embodiments can include pressurizing fluid with an electric blender to form a boost fluid, directing the boost fluid to the pump. In addition, the electricity that powers the motor can be generated with a generator that is proximate the electric motor, and a wireline system can be powered by the electricity.

Alternate embodiments of the present technology can include a method of operations in a subterranean formation, including generating electricity, energizing electric motors with the electricity, driving a fracturing pump with at least one of the electric motors, and driving a pump down pump with at least one of the electric motors. In certain embodiments, the electricity can be generated by a turbine generator, and the method can include powering a sand conveyer and hydration unit with the electricity.

In some embodiments, the method can further include using a first fluid pressurized by the fracturing pump to fracture the formation, and using a second fluid that is pressurized by the pump down pump in a pump down operation. In addition, the first fluid can be directed to a first wellbore that intersects the formation, and the second fluid can be directed to a second wellbore that intersects the formation.

Yet another embodiment of the present technology includes system for use in a subterranean formation operation. The system includes a pump down pump in communication with a first wellbore that intersects the formation, and that pressurizes fluid in the first wellbore, an electric motor that drives the pump down pump, and a tool positioned in the wellbore below at least a portion of the fluid pressurized by the pump down pump, and that is pushed toward the bottom of the wellbore by the fluid. Certain embodiments of the system can also include a hydraulic fracturing pump in communication with a second wellbore that intersects the formation, and that pressurizes fluid in the second wellbore, and the electric motor that drives the hydraulic fracturing pump.

According to some embodiments, the electric motor can be a first electric motor and a second electric motor, the first electric motor driving the pump down pump, and the second electric motor driving the hydraulic fracturing pump. In addition, the system can further include gas powered turbine generators, and a wireline system that is in electrical communication with the turbine generators.

BRIEF DESCRIPTION OF DRAWINGS

Some of the features and benefits of the present invention having been stated, others will become apparent as the description proceeds when taken in conjunction with the accompanying drawings, in which.

Figure 1A:
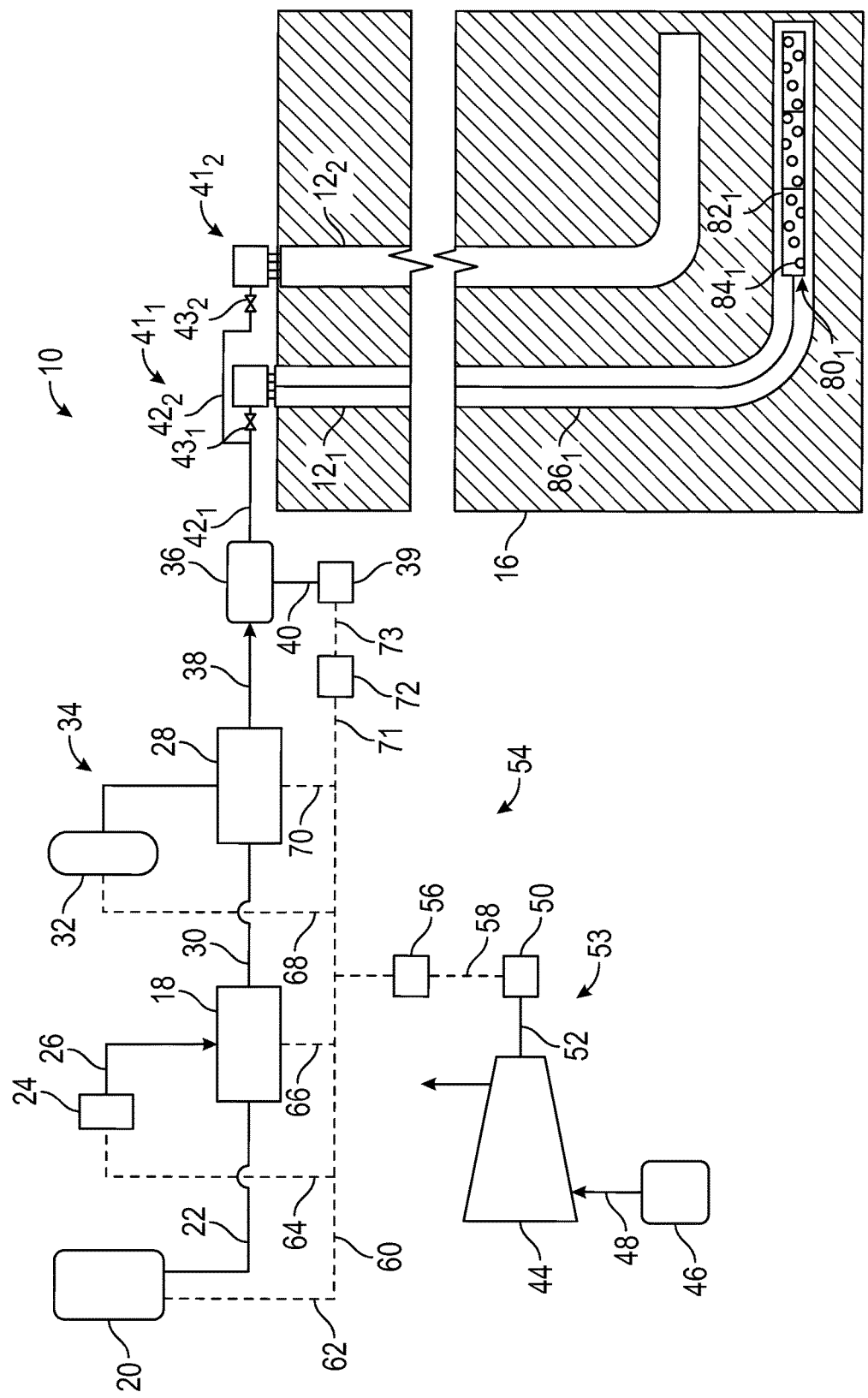
FIGS. 1A and 1B are schematic examples of a system for use in fracturing and pump down operations.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1A is a schematic example of a system 10 that is used for providing pressurized fluid to wellbores $12_1$, $12_2$ shown intersecting a subterranean formation 16. As will be described in more detail below, the pressurized fluid can be used in fracturing and/or pump down operations in the wellbores $12_1$, $12_2$. Included with the system 10 is a hydration unit 18 that receives fluid from a fluid source 20 via line 22, and also selectively receives additives from an additive source 24 via line 26. Additive source 24 can be separate from the hydration unit 18 as a stand-alone unit, or can be included as part of the same unit as the hydration unit 18. The fluid, which in one example is water, is mixed inside of the hydration unit 18 with the additives. In an embodiment, the fluid and additives are mixed over a period of time to allow for uniform distribution of the additives within the fluid. In the example of FIG. 1A, the fluid and additive mixture is transferred to a blender unit 28 via line 30. A proppant source 32 contains proppant, which is delivered to the blender unit 28 as represented by line 34, where line 34 can be a conveyer. Inside the blender unit 28, the proppant and fluid/additive mixture are combined to form a slurry, which is then transferred to a pump assembly 36 via line 38; thus fluid in line 38 includes the discharge of blender unit 28, which is the suction (or boost) for the pump assembly 36. Blender unit 28 can have an onboard chemical additive system, such as with chemical pumps and augers. Optionally, additive source 24 can provide chemicals to blender unit 28; or a separate and standalone chemical additive system (not shown) can be provided for delivering chemicals to the blender unit 28. In an example, the pressure of the slurry in line 38 ranges from around 80 psi to around 100 psi. The pressure of the slurry can be increased up to around 15,000 psi by pump assembly 36. A motor 39, which connects to pump assembly 36 via connection 40, drives pump assembly 36 so that it can pressurize the slurry.

After being discharged from pump assembly 36, slurry is injected into a wellhead assembly $41_1$, $41_2$; discharge piping $42_1$, $42_2$ connects discharge of pump assembly 36 with wellhead assembly $41_1$, $41_2$ and provides a conduit for the slurry between the pump assembly 36 and the wellhead assembly $41_1$, $41_2$. In an alternative, hoses or other connections can be used to provide a conduit for the slurry between the pump assembly 36 and the wellhead assembly $41_1$, $41_2$. Optionally, any type of fluid can be pressurized by the pump assembly 36 to form injection fluid that is then pumped into the wellbores $12_1$, $12_2$, and is not limited to fluids having chemicals or proppant. As detailed below, fluid from pump assembly 36 can be used for fracturing the formation 16, for pump down operations in wellbores $12_1$, $12_2$. Examples exist wherein the system 10 includes multiple pump assemblies 36, and multiple motors 39 for driving the multiple fracturing pump assemblies 36. Valves $43_1$, $43_2$, are shown provided respectively on lines $42_1$, $42_2$ for selectively allowing flow into the wellhead assemblies $41_1$, $41_2$.

An example of a turbine 44 is provided in the example of FIG. 1A and which receives a combustible fuel from a fuel source 46 via a feed line 48. In one example, the combustible fuel is natural gas, and the fuel source 46 can be a container of natural gas, a pipeline, or a well (not shown) proximate the turbine 44. Combustion of the fuel in the turbine 44 in turn powers a generator 50 that produces electricity. Shaft 52 connects generator 50 to turbine 44. The combination of the turbine 44, generator 50, and shaft 52 define a turbine generator 53. In another example, gearing can also be used to connect the turbine 44 and generator 50.

An example of a micro-grid 54 is further illustrated in FIG. 1A, which distributes electricity generated by the turbine generator 53. Included with the micro-grid 54 is a transformer 56 for stepping down voltage of the electricity generated by the generator 50 to a voltage more compatible for use by electrical powered devices in the system 10. In another example, the power generated by the turbine generator and the power utilized by the electrical powered devices in the system 10 are of the same voltage, such as 4160 V so that main power transformers are not needed. In one embodiment, multiple 3500 kVA dry cast coil transformers are utilized. Electricity generated in generator 50 is conveyed to transformer 56 via line 58. In one example, transformer 56 steps the voltage down from 13.8 kV to around 600 V. Other stepped down voltages can include 4,160 V, 480 V, or other voltages. The output or low voltage side of the transformer 56 connects to a power bus 60, lines 62, 64, 66, 68, 70, and 71 connect to power bus 60 and deliver electricity to electrically powered end users in the system 10. More specifically, line 62 connects fluid source 20 to bus 60, line 64 connects additive source 24 to bus 60, line 66 connects hydration unit 18 to bus 60, line 68 connects proppant source 32 to bus 60, line 70 connects blender unit 28 to bus 60, and line 71 connects bus 60 to a variable frequency drive ("VFD") 72. Line 73 connects VFD 72 to motor 39. In one example, VFD 72 selectively provides electrical power to motor 39 via line 73, and can be used to control operation of motor 39, and thus also operation of pump 36.

In an example, additive source 24 contains ten or more chemical pumps for supplementing the existing chemical pumps on the hydration unit 18 and blender unit 28. Chemicals from the additive source 24 can be delivered via lines 26 to either the hydration unit 18 and/or the blender unit 28. In one embodiment, the elements of the system 10 are mobile and can be readily transported to a well site adjacent the wellbore 12, such as on trailers or other platforms equipped with wheels or tracks.

Still referring to FIG. 1A, a pump down operation is shown being performed in wellbore $12_1$ and wherein a perforating string $80_1$ is being pumped down within wellbore $12_1$ by pressurized fluid from the pump system 36. Thus in this example, fluid being discharged from pump system 36 is handled within discharge piping $42_1$ and into wellhead assembly $41_1$ where it is used to urge the perforating string $80_1$ deeper into wellbore $12_1$. The example of the perforating string $80_1$ includes perforating guns $82_1$ stacked in series and coaxial with one another. Each of the perforating guns $82_1$ include a number of shaped charges $84_1$ that when detonated create perforations (not shown) within formation 16. In addition, the perforating guns typically may include plugs, to isolate the guns from certain portions of the well, such as portions down hole from the guns. As will be described below, the perforations provide a starting point for fractures to be formed within formation 16 by introduction of high pressure fluid within wellbore $12_1$. Each of wellbores $12_1$, $12_2$ are shown having vertical, deviated and horizontal sections; however, wellbores $12_1$, $12_2$ can each be substantially vertical, or one can be vertical and the other have deviated and horizontal portions. Further illustrated in FIG. 1A is a wireline $86_1$ which depends downward from the wellhead assembly $41_1$ and to perforating string $80_1$. Wireline $86_1$ can be used to deploy and retrieve perforating string $80_1$ from within wellbore $12_1$. Moreover, signals for initiating detonation of the shaped charges $84_1$ can come via wireline $86_1$ and from surface.

Figure 1B:
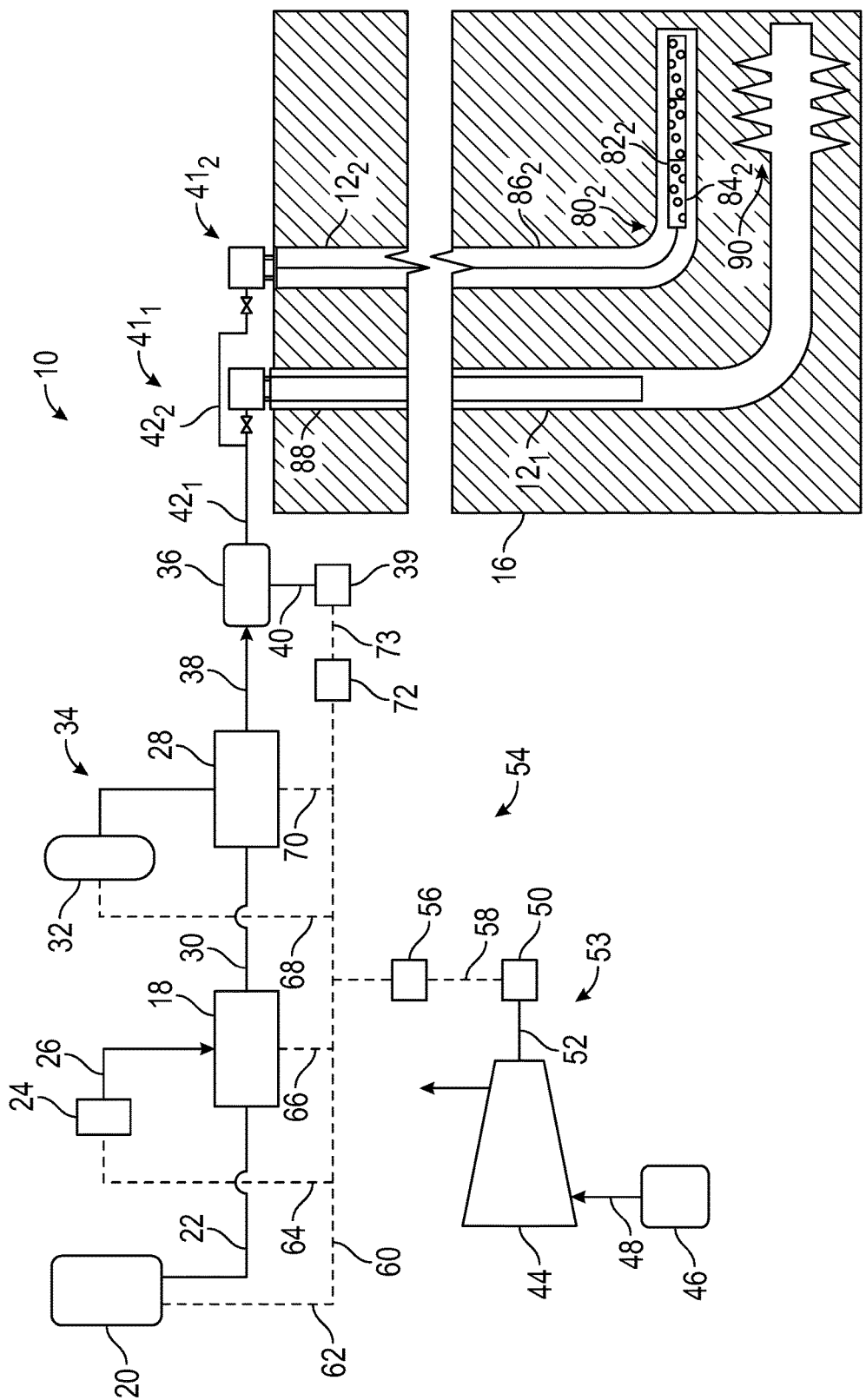

FIG. 1B illustrates an example where pressurized fluid from pump system 36 has been introduced into wellbore $12_1$ and so that perforations 90 are formed in formation 16 and that project radially outward from wellbore $12_1$. As indicated above, the perforations 90 created by shaped charges $84_1$ (FIG. 1A) provide initiation points within formation 16 from which fluid can propagate into formation 16 to form fractures.

An advantage of the system 10 is that in situations when wellbores $12_1$, $12_2$ are proximate one another, the pump system 36 can provide pressurized fluid to each of these wellbores $12_1$, $12_2$, and for different purposes. As illustrated in FIG. 1B, the step of hydraulic fracturing is taking place in wellbore $12_1$, while substantially simultaneously a pump down operation is occurring in wellbore $12_2$. More specifically, a perforating string $80_2$, similar in construction to the perforating string $80_1$ of FIG. 1A, is being deployed within wellbore $12_2$. Also, perforating string $80_2$ includes coaxially coupled perforating guns $82_2$ and which each include a number of shaped charges $84_2$ for creating perforations (not shown) within formation 16. Deployment, retrieval, and signal communication between surface and perforating string $80_2$ can be accomplished via wireline $86_2$ shown inserted within wellbore $12_2$.

In one example of operation, the system 10 can be used to selectively provide the pressurized fluid to the adjacent wellbores $12_1$, $12_2$ so that what is referred to in the industry as a zipper operation can take place. A zipper operation is where adjacent wellbores are perforated and fractured along an alternating sequence. Moreover, the zipper operation is done sequentially so that the different operations can be performed on different wells on the same well site, which speeds up completion activities. As illustrated in the figures described below, separate pumping systems can provide the fluid for the fracturing and the pump down operations.

Figure 2:
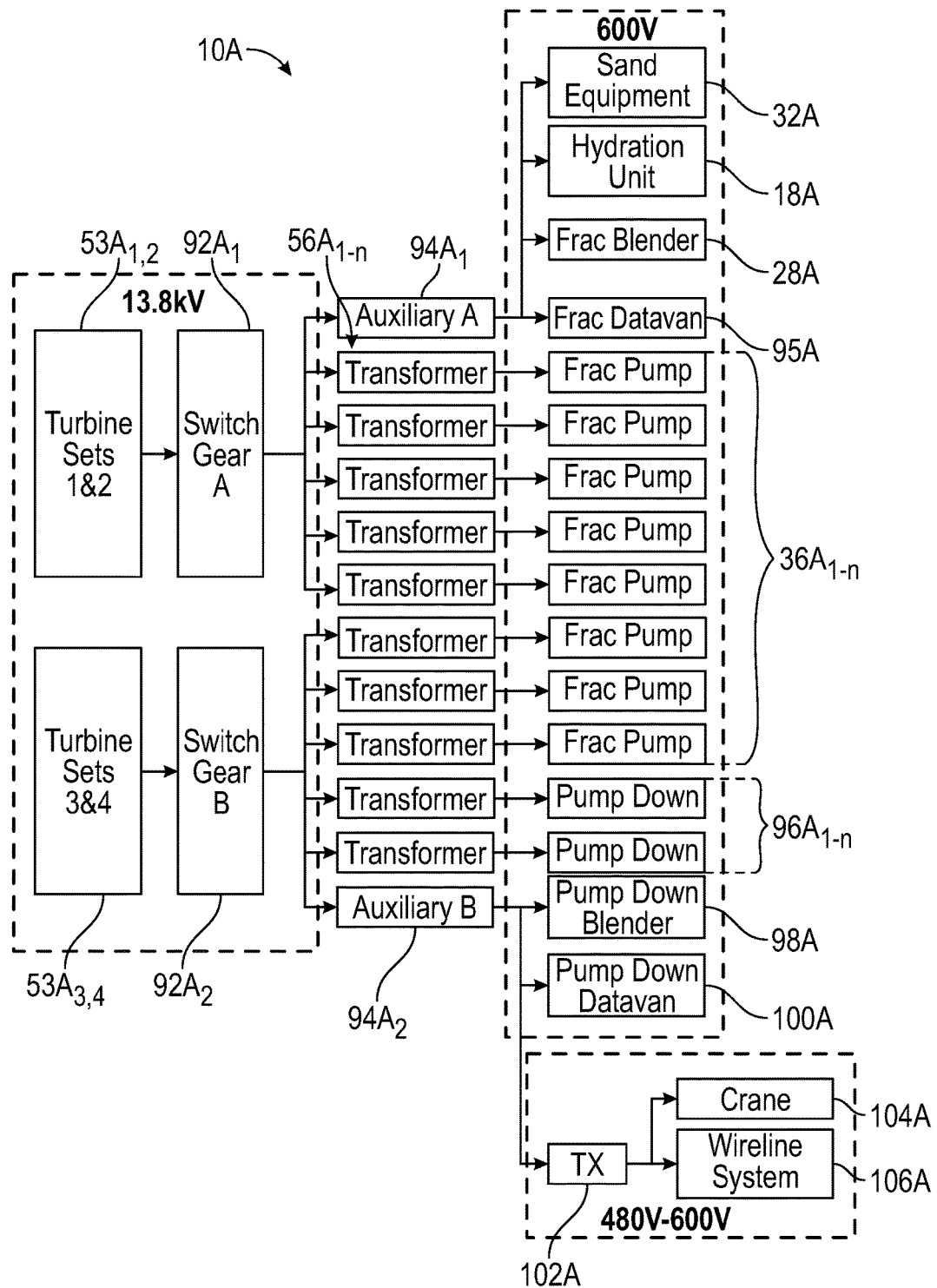
FIG. 2 is a plan schematic view of an alternate example of the system of FIG. 1.

Shown in FIG. 2 is a schematic plan view of one example of system 10A where turbine generators $53A_{1,2}$ and $53A_{3,4}$ respectively generate electricity that is delivered to switch gear $92A_1$ and $92A_2$, that in turn deliver the output electricity to transformers $56A_{1-n}$ and auxiliary units $94A_{1,2}$. Auxiliary unit $94A_1$ transmits electricity to sand equipment 32A, hydration unit 18A, frac blender 28A, and a frac data van 95A. In one example, frac data van 95A is an enclosed vehicle that provides controls and monitoring equipment for use in controlling and monitoring the fracturing system. Electricity from transformers $56A_{1-n}$, which is received from switch gear $92A_{1,2}$ is delivered at a designated voltage to fracturing pumps $36A_{1-n}$, wherein fracturing pumps $36A_{1-n}$ are dedicated to pressurizing fluid for use in fracturing operations. Also from transformers $56A_{1-n}$ electricity is transmitted to pump down units $96A_{1-n}$ that are used for pressurizing fluid used in pump down operations as described above. It should be pointed out, that the pump down operations are not limited to disposing perforating strings within wellbores, but can include any other type of equipment that is to be positioned at a designated depth within a wellbore.

Further illustrated in FIG. 2 is that auxiliary $94A_2$ has an output that delivers electricity to a blender 98A for use in pump down and a data van 100A that is also used for pump down. The separate data van 100A and blender 98A can be used, for example, during zipper fracturing operations, but are not required for stack fracturing operations. This is because during stack fracturing operations, only one operation is occurring at a time, so the frac data van 95A and frac blender 28A can be used for all operations. Further illustrated in FIG. 2 is that the power from auxiliary $94A_2$ transmits to an optional transformer 102A, which can be used to step down electricity for use by a crane 104A and wireline system 106A if the crane 104A and wireline system 106A require a lower voltage than the fracturing equipment. Examples exist where crane 104A and wireline system 106A provide the hoisting and signal capabilities for the wireline $86_{1,2}$ of FIGS. 1A and 1B. Moreover, wireline system 106A can include a wireline truck having a spool of wireline as well as controllers and initiation hardware for sending communication and initiation signals down the wireline $86_{1,2}$.

Figure 3:
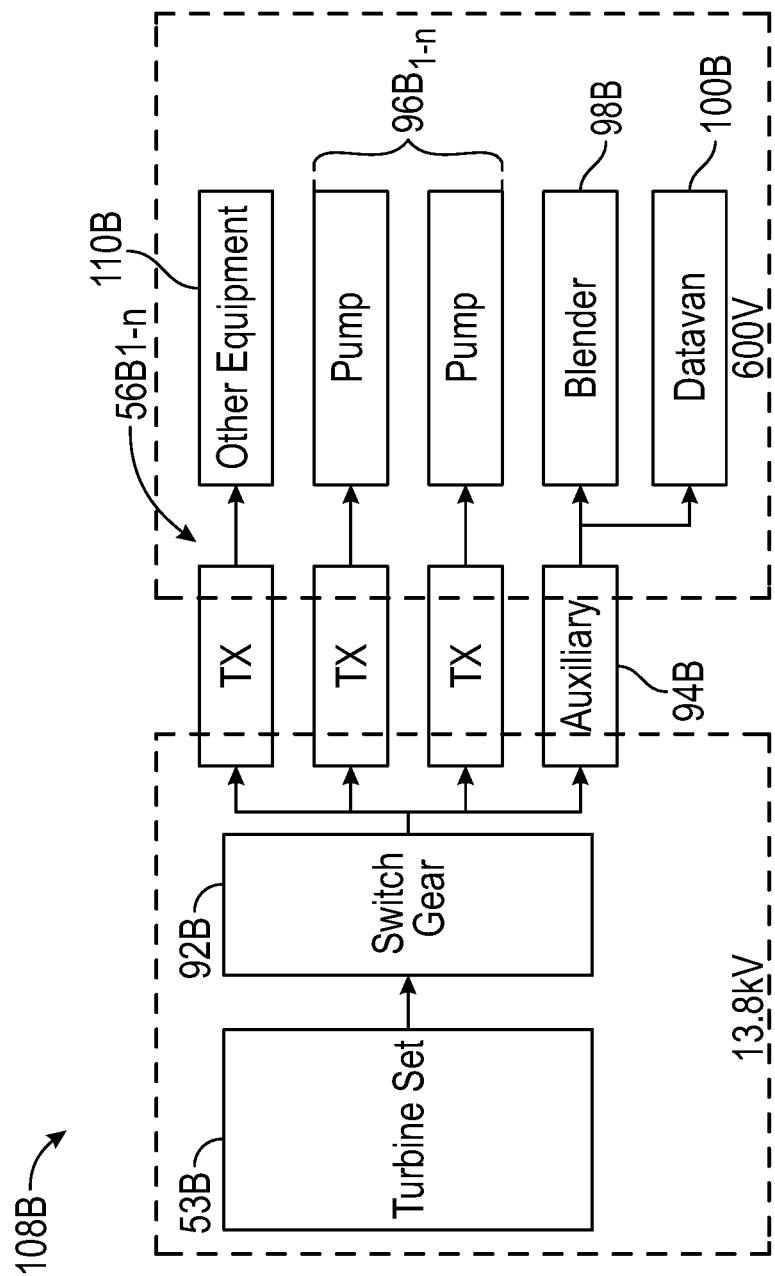
FIG. 3 is a plan schematic view of an example of an electrically powered pump down system.

FIG. 3 shows, in a schematic plan view, one example of a pump down system 108B that pressurizes fluid for use in a pump down operation. In this example, a turbine set 53B is used for generating electricity, and that like the other turbine sets described herein is powered by combustion of natural gas that then drives a generator to produce electricity. The electricity is delivered to switch gear 92B and which has an output shown in communication with transformers $56B_{1-N}$ and auxiliary 94B. One of transformers $56B_{1-N}$ delivers electricity to other equipment 110B which can include, for example, glycol heaters, light plants, a company man trailer, water transfer pumps, a crane, wellsite tools, etc. Others of the transformers $56B_{1-n}$ have outputs at designated voltages (e.g., 600V, 480V, or step up transformers) that communicate with pump down pumps $96B_{1-n}$ that are schematically illustrated provided on trailers and within the pump down system 108B. Further included with the pump down system 108B is a blender 98B for blending the fluid that is then to be pressurized by the pump down pumps, and a data van 100B which provides a location for personnel to control and monitor equipment within the pump down system 108B. In this example, electricity is generated specifically for the pump down pumps and is not diverted from that being used to drive pumps used for fracturing. Additionally, the fluid being pressurized is from the pump down pumps and not from a fracturing pump.

Figure 4:
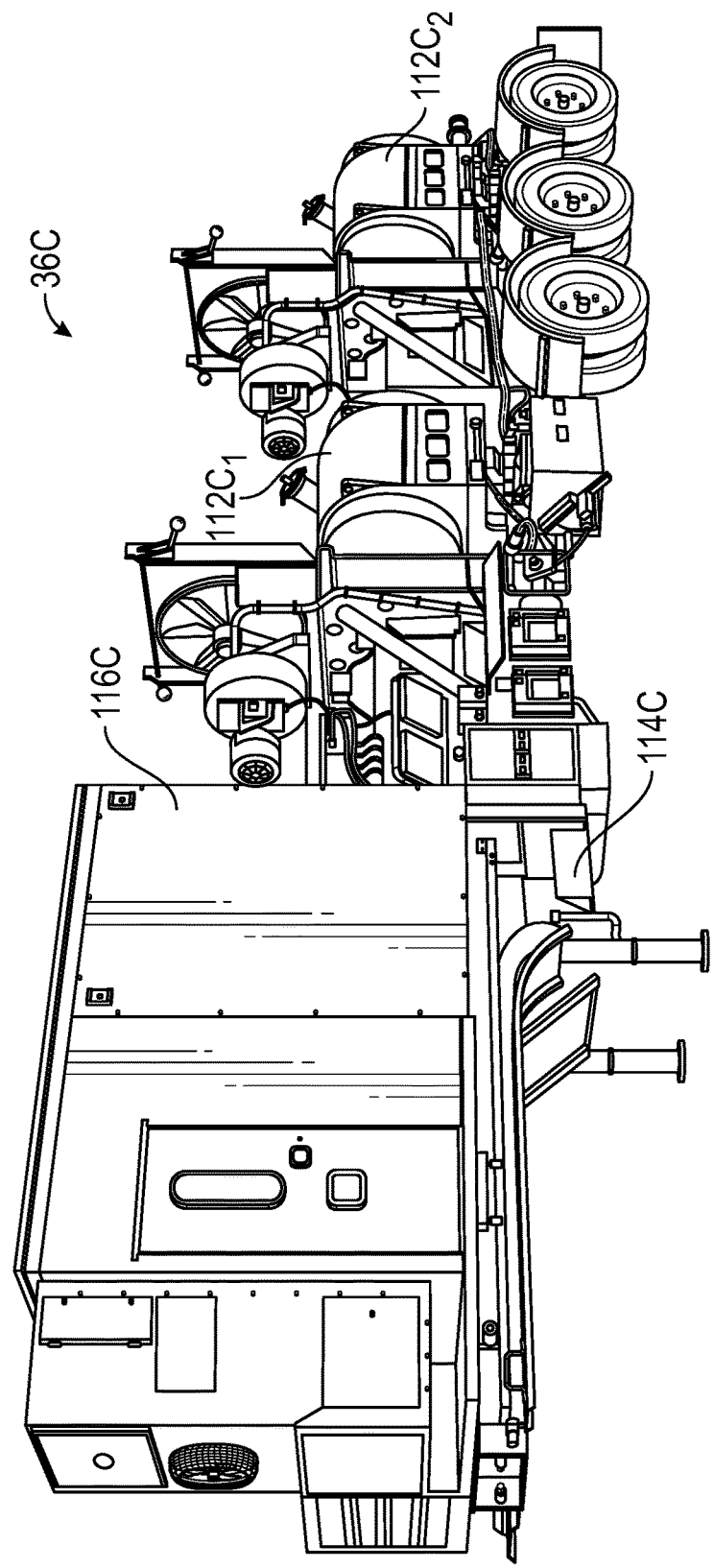
FIG. 4 is a perspective view of an example of a pump system for use with the hydraulic fracturing system of FIGS. 1A and 1B.

Provided in a perspective view in FIG. 4 is one example of a pump system 36C, which can be used either for pump down operations or for fracturing operations. In the illustrated example, pumps $112C_{1,2}$ are shown mounted on a trailer 114C so that the pumps $112C_{1,2}$ can be readily transported to different locations for onsite operation. Additionally, a VFD housing 116C is also mounted on trailer 114C and in which equipment such as VFDs for pumps, isolation breakers, and a motor control center can be situated during operation of pumps $112C_{1,2}$. The motor control cabinet can be a breaker cabinet that contains breakers for smaller motors such as blower motors, lube motors, and fan motors.

Figure 5:
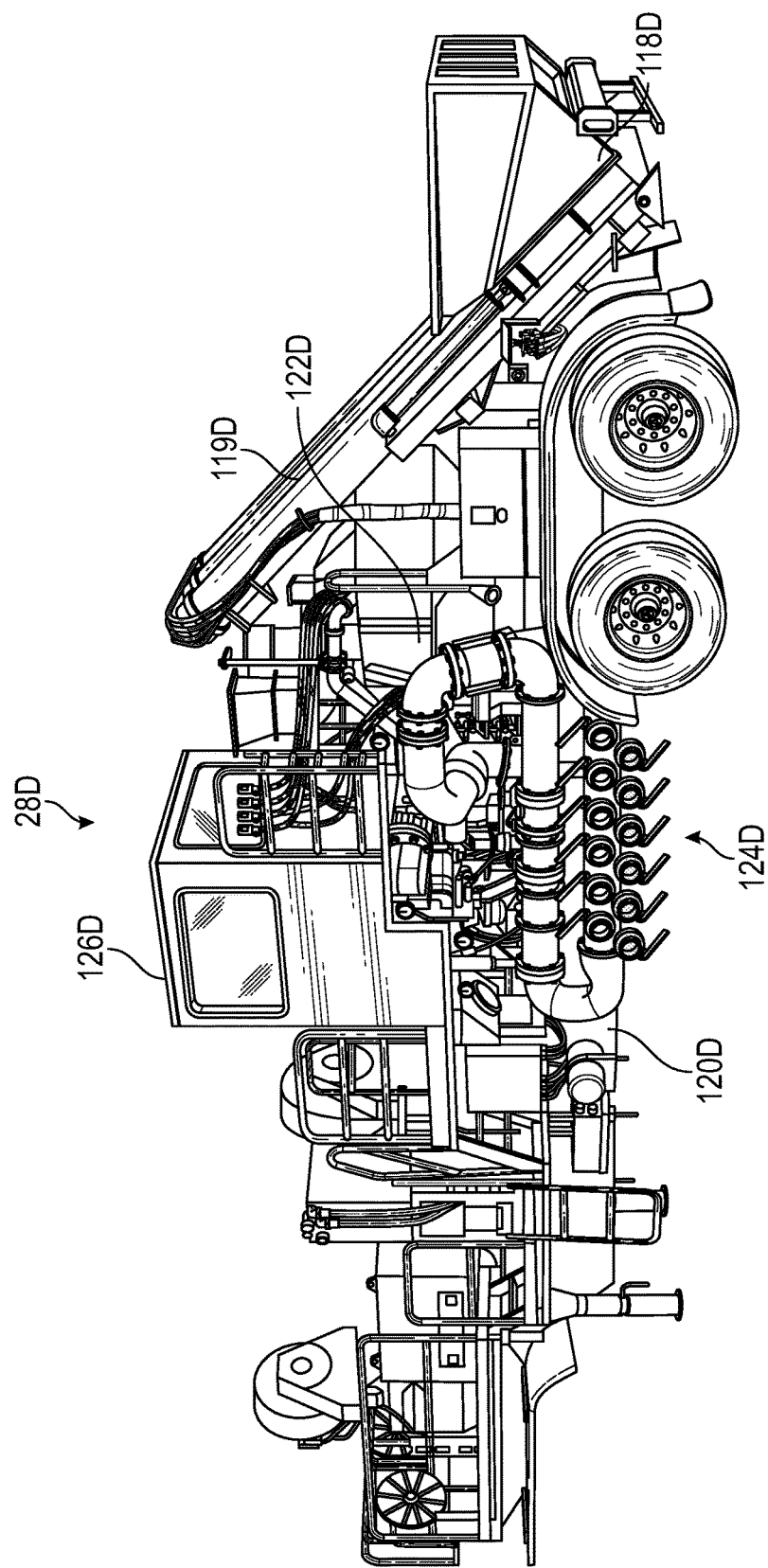
FIG. 5 is a perspective view of an example of a blender unit for use with the system of FIGS. 1A and 1B.

Shown in FIG. 5 is an example of a blender unit 28D shown in a perspective view. Here, blender unit 28D is shown including a hopper 118D and auger assembly 119D, and wherein the hopper 118D receives sand or other proppant from a sand source, such as a conveyor (shown in FIG. 1). Auger assembly 119D, which is an elongated section having barrel and auger screws rotatably disposed within, urge the sand upward. Hopper 118D and auger assembly 119D are mounted on a trailer 120D and adjacent a mixing tub 122D, which is typically an open top tub where sand, water, and chemicals are mixed together to form a slurry that is then provided to pumps where the fluid is pressurized. The slurry that flows to pumps is directed through a manifold 124D that mounts on a lower end of trailer 120D. Also included with the blender unit 28D is a control room 126D which communicates with the data van, houses operations personnel, and provides monitoring and controls devices for operating and monitoring of the blender unit 28D.

Figure 6:
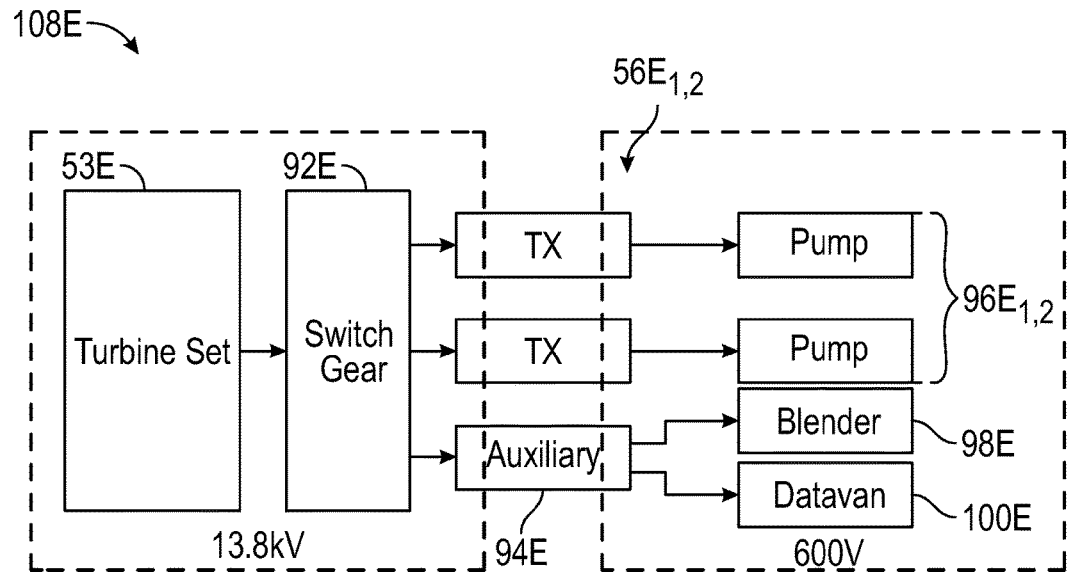
FIGS. 6 and 7 are plan schematic views of alternate examples of an electrically powered pump down system.

An alternate embodiment of a pump down system 108E is shown in a plan schematic view in FIG. 6, where turbine set 53E with a gas powered turbine generator generates electricity that is then delivered to a switch gear 92E. Output from switch gear 92E is delivered to transformers $56E_{1,2}$ that in turn provide electrical power to pump down pumps $96E_{1-2}$ shown mounted on trailers. Electricity from switch gear 92E is also directed to an auxiliary unit 94E that supplies electricity to both a blender 98E and data van 100E. Included within blender 98E is a pump (not shown) that in some embodiments pressurizes fluid to a boost pressure that is then delivered to the pump down pumps $96E_{1-2}$. In an example, the blender 98E pressurizes the fluid in a range from about 70 psi to about 120 psi. Further, within electric blender 98E chemical additives can be added to the fluid that is then delivered to the pump down pumps. Other examples exist, wherein blender for use with a pump down system is a blender that is part of the fracturing system.

Figure 7:
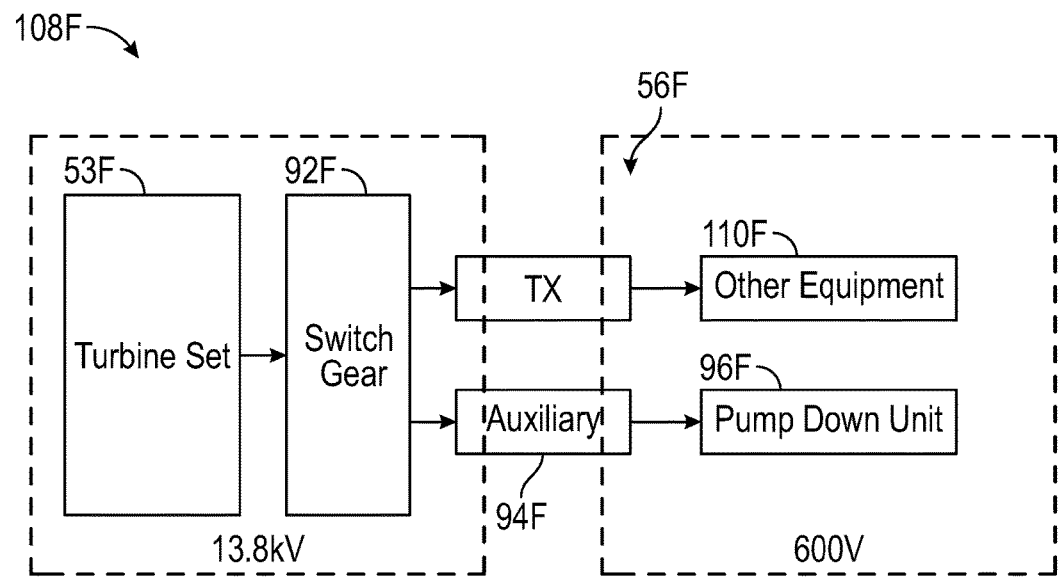

Another alternate example of the pump down system 108F is illustrated in plan schematic view in FIG. 7 and where turbine set 53F, which uses gas-powered turbines to generate electricity, delivers electricity to switch gear 92F. In this example, a transformer 56F receives electricity from switch gear 92F and delivers it to other equipment 110F. Also fed by switch gear 92F is auxiliary 94F, which in turn provides electrical power to pump down unit 96F that is independent of electrical power for the hydraulic fracturing pumps. In the embodiment of FIG. 7, the pump down unit 96F can include a small boost pump (capable of, for example, up to about 20 barrels per minute (bpm) at 100 psi instead of about 130 bpm for a blender), and a water pump (capable of about 20 bpm at 10,000 psi) to replace the hydraulic fracturing pumps. Thus, the pump down system 108F of FIG. 7 is capable of operating separately from the rest of the fracking system, or from the hydraulic fracturing pumps. This flexibility allows use of the electric powered pump down system with any type of hydraulic fracturing system, whether such system is powered by electricity, diesel, or otherwise. This is also true of the embodiments shown in FIGS. 3 and 6.

Figure 8:
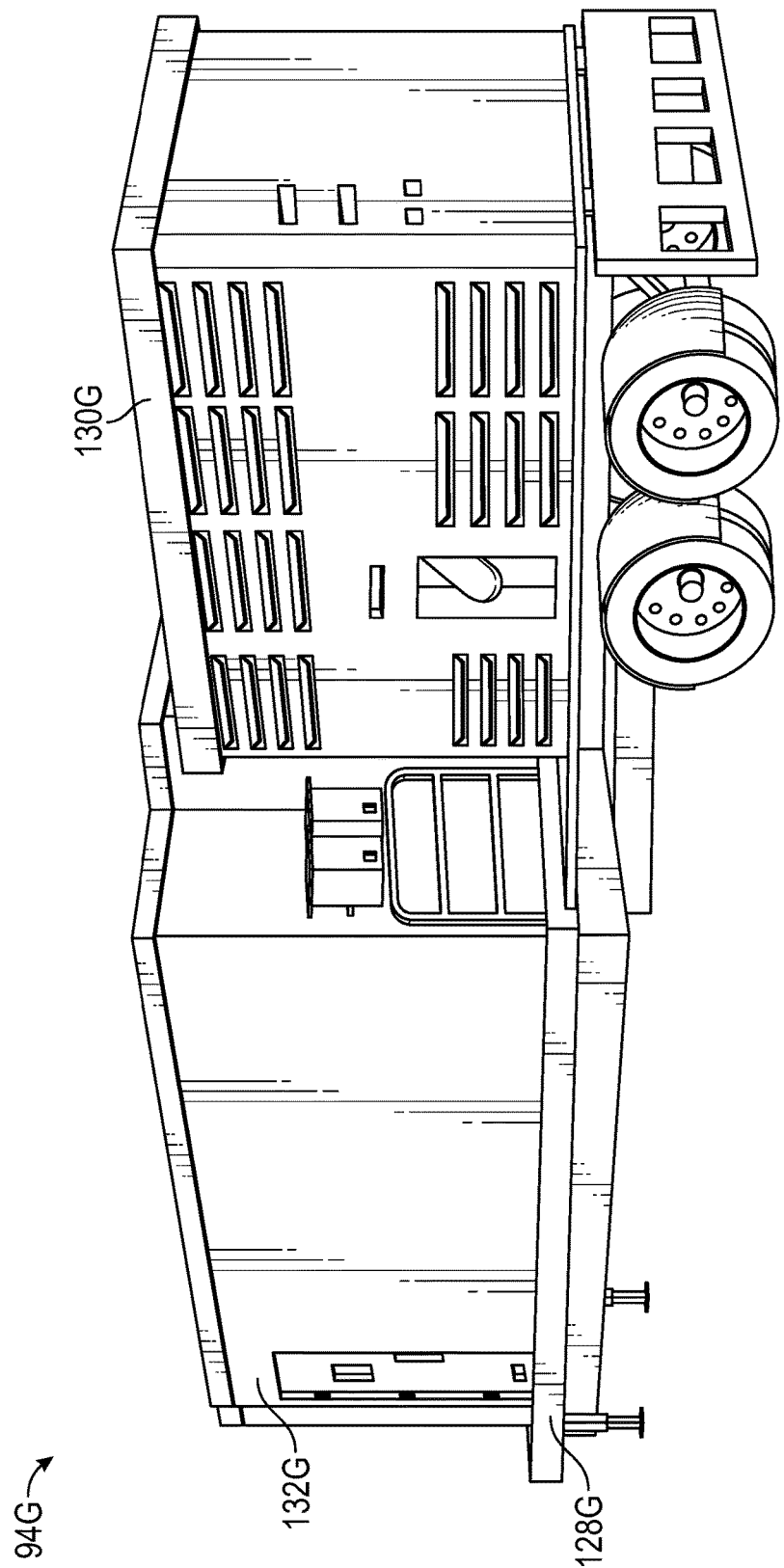
FIG. 8 is a perspective view of an example of an auxiliary unit for use with the system of FIGS. 1A, 1B, and 5.

FIG. 8 shows in a side perspective view an example of an auxiliary unit 94G and which includes a trailer 128G and on which a transformer 130G and a VFD house 132G are mounted. The VFD house 132G and transformer 130G can be used to power and control the desired equipment, such as, for example, the blender, the hydration unit, the conveyor, and/or the data van. The VFD house 132G can also contain soft starters for, large non speed controlled motors, smaller blower motors and radiator fans for cooling. Power can be provided from turbines, to a switchgear, then to the auxiliary unit 94G. The transformer 130G can be used, for example, to convert power from 13.8 kV to 600V to provide power to the VFD house. The blender did not have room to contain its own VFD therefore the Auxiliary Trailer was created to serve this purpose. Each hydraulic fracturing site can benefit from the use of a single auxiliary unit 94G or multiple auxiliary units 94G depending on the individual needs and circumstances at the site.

Use of auxiliary units 94G is advantageous because each separate auxiliary unit 94G provides a separate power grid, thereby creating multiple power centers, which in turn allows for greater flexibility in the positioning of equipment at a site, and creates redundancy in the operations. The use of auxiliary units 94G also helps with power cable management, providing multiple different cable routing for the equipment.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of operations in a subterranean formation, the method comprising:
    driving a pump with an electrically powered motor to pressurize fluid;
    inserting a tool into a wellbore that intersects the formation;
    pressurizing fluid with a boost pump to form a boost fluid;
    directing the boost fluid to the pump; and
    directing the pressurized fluid into the wellbore above the tool to push the tool into the wellbore.

2. The method of claim 1, further comprising urging the tool into the wellbore with the pressurized fluid until the tool reaches a predetermined location in the formation.

3. The method of claim 1, wherein the tool comprises a perforating gun.

4. The method of claim 1, wherein the wellbore comprises a first wellbore, and wherein the pressurized fluid is simultaneously directed to a second wellbore that also intersects the subterranean formation.

5. The method of claim 4, wherein hydraulic fracturing is performed in the second wellbore.

6. The method of claim 5, wherein the pump comprises a first pump and a second pump, and wherein fluid pressurized by the first pump is directed into the first wellbore to push the tool into the first wellbore, and fluid pressurized by the second pump is directed into the second wellbore to use in hydraulic fracturing.

7. The method of claim 1, wherein the boost pump is an electric blender.

8. The method of claim 1, wherein electricity that powers the motor is generated with a generator that is proximate the electric motor.

9. The method of claim 8, wherein a wireline system is powered by the electricity.

10. A method of inserting a tool in a subterranean formation, the method comprising:
    generating electricity;
    energizing electric motors with the electricity;
    pressurizing fluid with a boost pump to form a boost fluid;
    directing the boost fluid to a pump down pump;
    driving a fracturing pump with at least one of the electric motors; and
    driving the pump down pump with at least one of the electric motors to push the tool in the wellbore.

11. The method of claim 10, wherein the electricity is generated by a diesel generator.

12. The method of claim 10, wherein the electricity is generated by a turbine generator.

13. The method of claim 10, further comprising powering a sand conveyer and hydration unit with the electricity.

14. The method of claim 10, further comprising using a first fluid pressurized by the fracturing pump to fracture the formation, and using a second fluid that is pressurized by the pump down pump in a pump down operation.

15. The method of claim 14, wherein the first fluid is directed to a first wellbore that intersects the formation, and the second fluid is directed to a second wellbore that intersects the formation.

16. A system for use in a subterranean formation operation comprising:
    a pump down pump in communication with a wellbore that intersects the formation, and that pressurizes fluid in the wellbore;
    a hydraulic fracturing pump in communication with the wellbore that intersects the formation, and that pressurizes fluid in the wellbore;
    an electric motor that drives the pump down pump;
    a tool positioned in the wellbore below at least a portion of the fluid pressurized by the pump down pump, and that is pushed toward the bottom of the wellbore by the fluid.

17. The system of claim 16, wherein the electric motor is a first electric motor and a second electric motor, the first electric motor driving the pump down pump, and the second electric motor driving the hydraulic fracturing pump.

18. The system of claim 16, further comprising gas powered turbine generators.

19. The system of claim 18, further comprising a wireline system that is in electrical communication with the turbine generators.

20. The system of claim 16, wherein the wellbore is a first wellbore and a second wellbore, the pump down pump is in communication with the first wellbore, and the hydraulic fracturing pump is in communication with the second wellbore.

* * * * *

(12) INTER PARTES REVIEW CERTIFICATE (3844th)
United States Patent
Oehring et al.

(10) Number: US 9,745,840 K1
(45) Certificate Issued: Dec. 24, 2024

(54) ELECTRIC POWERED PUMP DOWN

(71) Applicants: Jared Oehring; Brandon N. Hinderliter

(72) Inventors: Jared Oehring; Brandon N. Hinderliter

(73) Assignee: U.S. WELL SERVICES, LLC

Trial Number:

IPR2021-01037 filed Jun. 21, 2021

Inter Partes Review Certificate for:

Patent No.: 9,745,840
Issued: Aug. 29, 2017
Appl. No.: 15/291,842
Filed: Oct. 12, 2016

The results of IPR2021-01037 are reflected in this inter partes review certificate under 35 U.S.C. 318(b).

INTER PARTES REVIEW CERTIFICATE
U.S. Patent 9,745,840 K1
Trial No. IPR2021-01037
Certificate Issued Dec. 24, 2024

AS A RESULT OF THE INTER PARTES REVIEW PROCEEDING, IT HAS BEEN DETERMINED THAT:

Claims 1-20 are cancelled.

\* \* \* \* \*